United States Patent [19]

Puech et al.

[11] Patent Number: 5,323,372
[45] Date of Patent: Jun. 21, 1994

[54] METHOD OF OPTICAL WRITING AND READING ON INFORMATION CARRIER WITH HIGH DENSITY STORAGE

[75] Inventors: Claude Puech, Ballainvillers; Jean-Pierre Huignard, Paris; Michel Papuchon, Villebon; Brigitte Loiseaux, Villebon sur Yvette, all of France

[73] Assignee: Thomson-CSF, Puteaux, France

[21] Appl. No.: 886,169

[22] Filed: May 21, 1992

[30] Foreign Application Priority Data

May 21, 1991 [FR] France ................ 91 06111

[51] Int. Cl.$^5$ ............................... G11B 7/00
[52] U.S. Cl. ...................... 369/100; 369/112; 369/275.2
[58] Field of Search .............. 369/100, 109, 116, 118, 369/275.1, 275.2, 112, 121, 122

[56] References Cited

U.S. PATENT DOCUMENTS

| 3,812,496 | 5/1974 | Brooks ........................... 369/109 |
| 4,360,908 | 11/1982 | Howe et al. ................. 369/275.1 |
| 5,153,873 | 10/1992 | Spruit et al. ................ 369/100 |

FOREIGN PATENT DOCUMENTS 0343727 11/1989 European Pat. Off. .
0354601 2/1990 European Pat. Off. .
2308439 12/1990 Japan .
2130423 5/1984 United Kingdom .

OTHER PUBLICATIONS

Journal of Applied Physics vol. 63, No. 11, Jun. 1, 1988, Woodbury, N.Y., USA "Anomalous Electroabsorption in Semi-Insulating GaAs", L. M. Walpita, pp. 5495-5499.

Philips Technical Review vol. 42, No. 2 Aug. 1985, Eindhoven, Netherlands "Erasable Magneto-Optical Recording", M. Hartmann, et al. pp. 37-47.

Primary Examiner—Constantine Hannaher
Assistant Examiner—Kiet T. Nguyen
Attorney, Agent, or Firm—Oblon, Spivak, McClelland, Maier & Neustadt

[57] ABSTRACT

A method for the optical writing of information elements uses a material (Ma) that is highly non-linear optically, on which it is possible to record information elements with sizes several times smaller than the writing wavelength. Also disclosed is a method for the reading of information elements recorded on a material (Ma) deposited on a material (Mb) capable of being the site of a stimulated emission generating the reading of the recorded information elements. Applications: high definition television, digital sound.

13 Claims, 5 Drawing Sheets

METHOD OF OPTICAL WRITING AND READING ON INFORMATION CARRIER WITH HIGH DENSITY STORAGE

BACKGROUND OF THE INVENTION

1. Field of the Invention

The present invention relates to the storage of information by optical means, as well as to the reading of this information.

In technologies for the optical storage of information, the maximum density of storage is limited by the diffraction at the wavelength of the writing or of the reading. For the optical wavelengths commercially available in the form of laser diodes, this limit may be, for example, in the region of one bit per square micrometer. With the new blue laser sources emitting towards 0.4–0.5 μm, it becomes possible to increase the storage of the information accordingly. Typically, an increase in storage density by a factor of 4 to 5 is expected as compared with current sources emitting in the near infra-red range. However, even these storage systems do not appear to be likely to enable surface densities of information suited to the storage of high definition television signals of a duration sufficient for large-scale consumer applications.

In this context, systems based on storage in volume have been proposed more recently. These systems should provide a gain by a factor of several tens in terms of surface density of information elements, but with the drawback of substantially increased complexity.

This is why the present invention proposes a new method of optical writing capable of giving rise to information carriers with high density of surface storage. The present invention also proposes a method for the reading of an information carrier with high density of surface storage.

2. Description of the Prior Art

At present, the approaches that enable surface storage are limited by problems of diffraction.

Figure 1A:
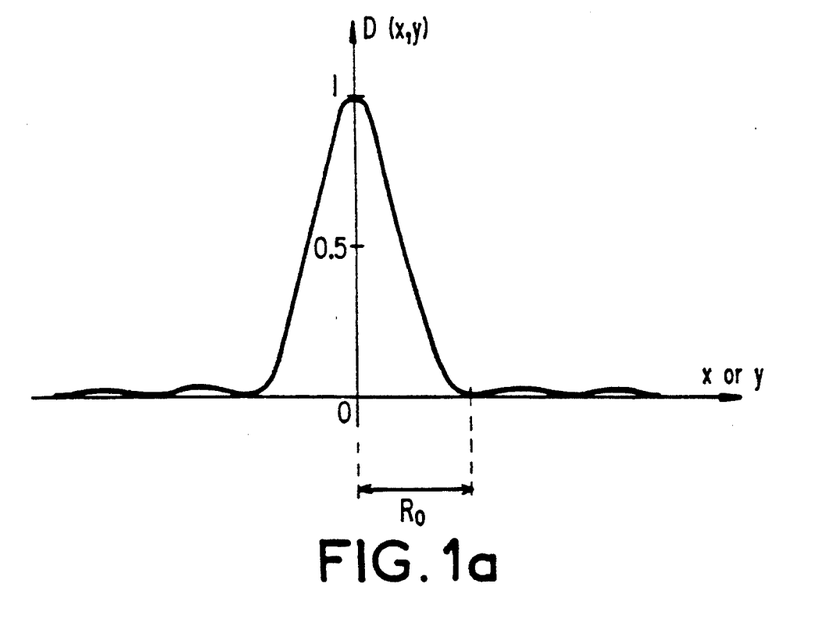
FIG. 1a shows the shape of the curve of distribution as a function of one of the dimensions x and y of the surface area on which there is focusing.
Figure 1B:
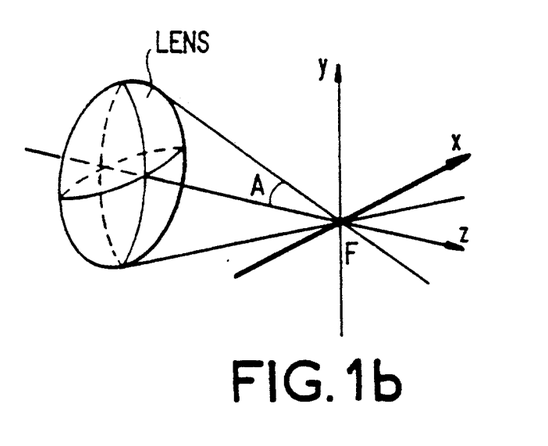

Indeed, when a writing laser beam is focused on the surface of a carrier, it is not focused at one point but in a region in which the distribution of density of power is the one shown in FIG. 1a. It is defined by the following surface equation:

$$D(x,y) = [2J_1(Z)]^2/Z^2$$

with $Z = 2\pi(x^2+y^2)^{\frac{1}{2}}(\sin A)/L$ where
  $J_1$ is the first order Bessel function
and
  x and Y are surface coordinates, and
where
  L is the wavelength of the incident beam.
  A is the angle defining the focus of the lens used for the convergence of the beam (this angle is shown in FIG. 1b). It is the angle of aperture of the focusing lens.

Thus the focusing spot, called the Airy spot, has a base is defined by a radius $R_o$ with $$R_o = 1.22 \, L/2 \sin A$$

These relationships are valid in the case of a uniform illumination of the pupil of the objective and for a less chromatic radiation. In practice, since the laser beam has a Gaussian distribution, the illumination in the pupil of the objective has an intensity with the shape of a truncated Gaussian curve. Furthermore, it has a certain spectral width. The distribution of illumination at the focus of the objective is not exactly an Airy function, but the approximation made herein is considered to be representative of the real phenomenon.

In the extreme case of a maximum focusing aperture (A=90°), $R_{om} = 1.22 \, L/2$. However, for a smaller aperture, hence for a smaller field depth, the base of the Airy spot has a radius greater than $R_{om}$. The radius $R_{om}$ corresponds rather to the size of the spot at mid-height of the curve D(x,y) and enables the definition of the size of an information element recorded with a sufficient density of power. Thus, typically, in using a recording beam focused at the wavelength L, it is not possible to record information elements having a lateral size smaller than L.

Figure 2:
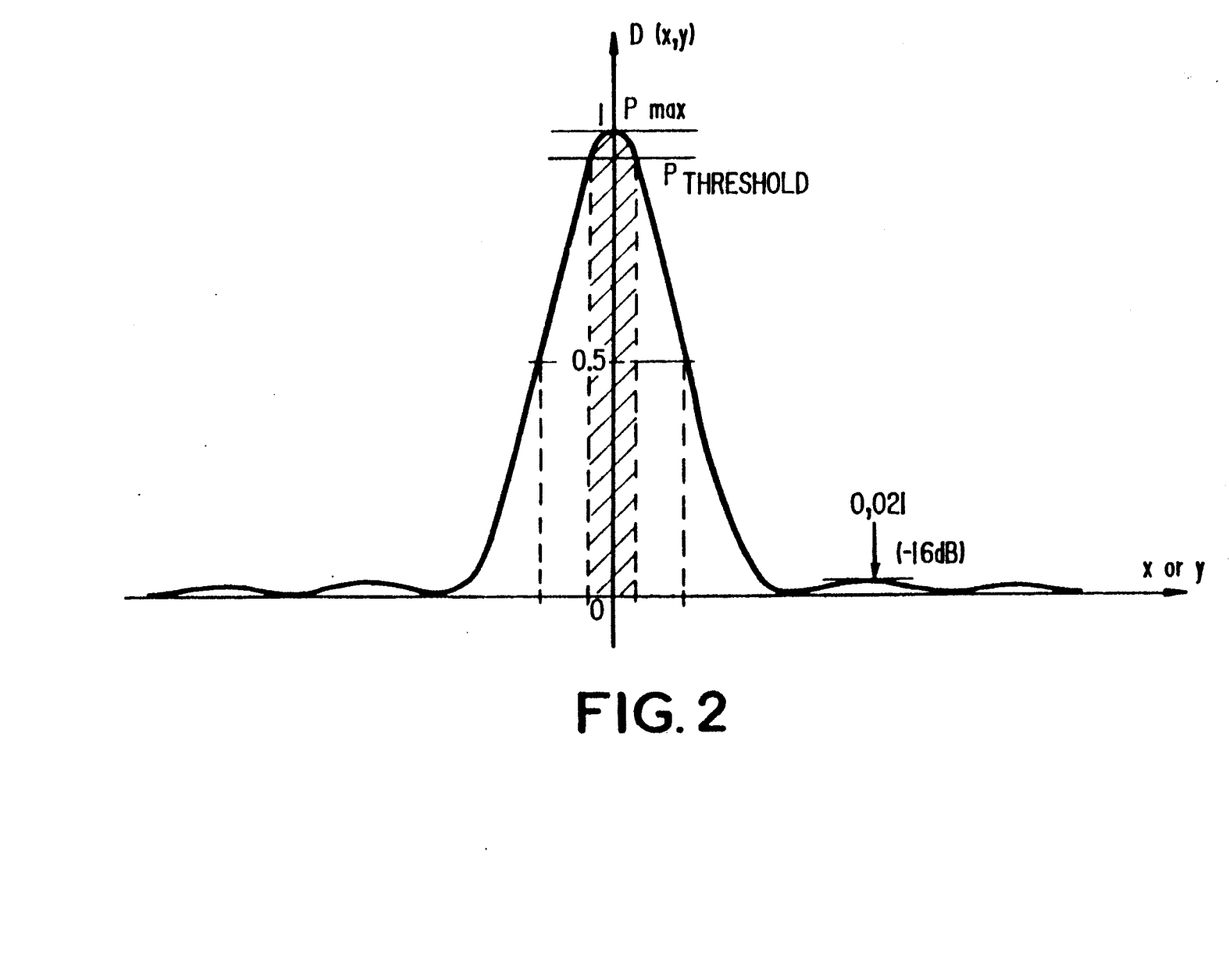
FIG. 2b enables the locating, on a curve of power density of a focused beam, of the threshold power density beyond which the optically non-linear material (used in the invention) gets transformed.
Figure 3:
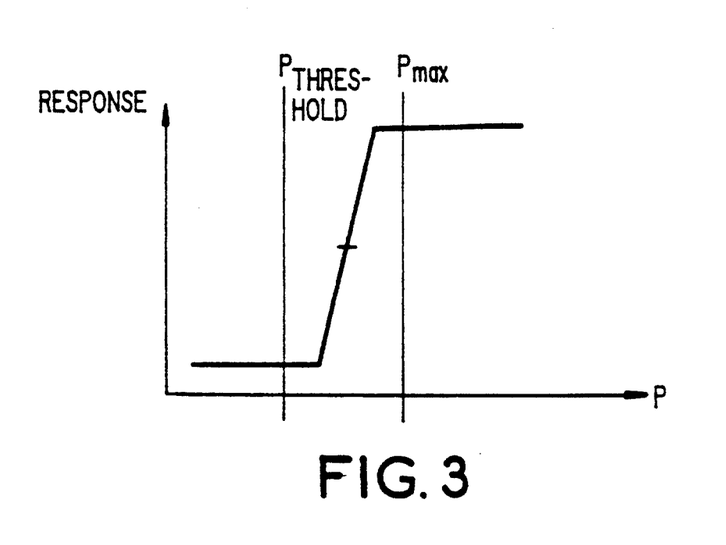
FIG. 3 shows a schematic view of the optical response of the material (Ma) as a function of the power density that it receives.

The present invention proposes the use of a material that is highly non-linear optically (Ma) and a focused laser beam having a maximum power density Pmax such that the threshold power density Pthreshold of the material (Ma) is slightly lower than Pmax. FIG. 2 shows that the invention uses the upper part of the curve D(x,y). It is concerned with the regions in which a small variation of the density of recording power leads to corresponding reductions at the level of the surface of the recorded information elements. The optical response of the material (Ma) should therefore be as highly non-linear as possible and the densities of power $P_{max}$ and $P_{threshold}$ are matched in such a way as to be on either side of the bending point of the curve illustrating the optical response of the material (Ma) with the density of power that it receives. This curve is shown schematically in FIG. 3. The hatched part of FIG. 2 corresponds to zones in which the material is transformed optically and which define the regions in which there has been a recording of information elements.

The size of the information elements may thus be far smaller than in the prior art and, hence, for an equivalent storage surface area, the storage density is notably increased.

SUMMARY OF THE INVENTION

More specifically, the invention proposes a method for the optical writing of information elements wherein:
  it uses a laser with a wavelength L focused on the surface of the material (Ma) that is highly non-linear optically;
  the maximum power density of the focused laser beam is slightly greater than the threshold power density of the material (Ma) beyond which the material (Ma) can get transformed optically so as to record an information element that is appreciably smaller than the focusing spot of the beam used.

In other words, the power of the laser is chosen so that the power density in the laser beam exceeds the threshold power density only in a zone with a surface area that is several times smaller than the surface area of the focusing spot of the beam (for example, at least three times smaller).

Preferably, the material (Ma) may be a photosensitive resin or a magneto-optical material or a metallic material or a material with phase transition.

An object of the invention is also the carrier of information recorded by the above-described writing method, the information carrier being one wherein, if L is the wavelength of the writing beam, then the recorded elements have at least one lateral dimension smaller than L/2, these information elements being possibly holes. In the carrier according to the invention, the material (Ma) may be deposited on a material (Mb) capable itself of generating a light radiation by stimulated emission.

In the prior art, the wavelengths used are such that it is possible neither to write very small-sized information elements (smaller than L if L is the writing wavelength) nor even to read the very small-sized information elements which would have been written by other methods for reasons related to the focusing of the reading beam and to "smearing".

This is why another object of the invention is a method for the optical reading of a very small-sized information carrier. This method uses a carrier comprising two superimposed layers of material (Ma) and material (Mb), the material (Mb) being a material capable of stimulated emission when it receives a power only the regions (Ra) of the material (Ma) in which information elements have been recorded are transparent to the reading wavelength L1;

the focusing of the reading beam at the wavelength L1 is done on the surface of the regions (Rb) of the material (Mb) that are facing the regions (Ra);

the reading laser beam has a power such that the power-density at the center of the beam exceeds the threshold power solely in a small zone with a surface area that is several times smaller than the surface area of the focusing spot of the laser beam.

The detection of information is done by the detection of the presence or absence of a stimulated emission.

The material (Ma) used may be metallic, the regions (Ra) may be holes and the material (Mb) may equally well be a semiconductor or a polymer doped with a dye or a glass or a crystal doped with rare earths.

Finally, an object of the invention is the carrier for optical storage capable of being read by the reading method according to the invention, the carrier comprising at least two layers of materials deposited on a substrate, the upper layer serving as a carrier for the recording of information, the lower layer representing a medium capable of emitting light by stimulated emission during the reading.

BRIEF DESCRIPTION OF THE DRAWINGS

The present invention shall be understood more clearly and other advantages shall appear from the following description and from the appended figures, of which:

FIG. 1 shows the distribution of power density of a laser beam focused by a lens (L);

FIG. 1b defines the angle A corresponding to the focus of the lens L, this angle playing a direct role in the determining of the base of the curve shown in FIG. 1a;

MORE DETAILED DESCRIPTION

Figure 4:
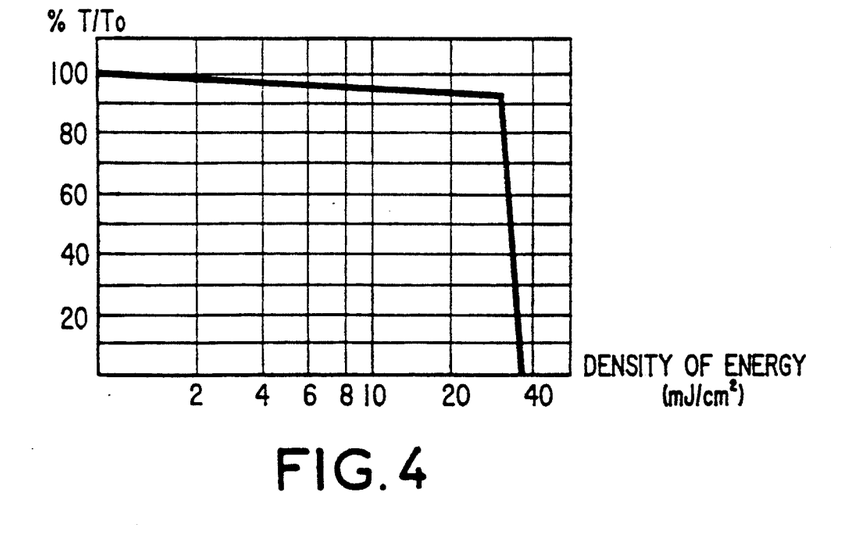
FIG. 4 illustrates the highly non-linear optical response of a photosensitive resin that can be used in the invention.

The present invention proposes a new method of optical writing on a carrier comprising a layer of material (Ma), the optical response of which is highly non-linear; the material (Ma) may be a photosensitive resin. The chemical development of which may enable a submicronic resolution to be achieved. The response of certain photosensitive resins may be more highly non-linear as shown in FIG. 4. This is a Shipley S1400 resin, developed with a developer MF 314, To being the initial thickness and T being the thickness after insolation. The curve shown in FIG. 4 shows the progress of the ratio T/To in terms of percentage as a function of the density of energy received by the resin. The behavior of this material is particularly promising for the defining of a power density of the focused writing laser beam close to the threshold power density of the photosensitive resin used.

The material (Ma) may be a material in which a variation of refraction index can be photoinduced. One of the promising features of materials such as these is that they can record an information element in optical form without going through a stage of chemical development. They may be, for example, photopolymer materials.

Photosensitive resins or photopolymers can easily be deposited on any substrate by the centrifugation method. The thickness of the layer of material (Ma) can be easily adjusted by determining the centrifugation speed and by determining the concentration of the initial solution of material (Ma).

Figure 5:
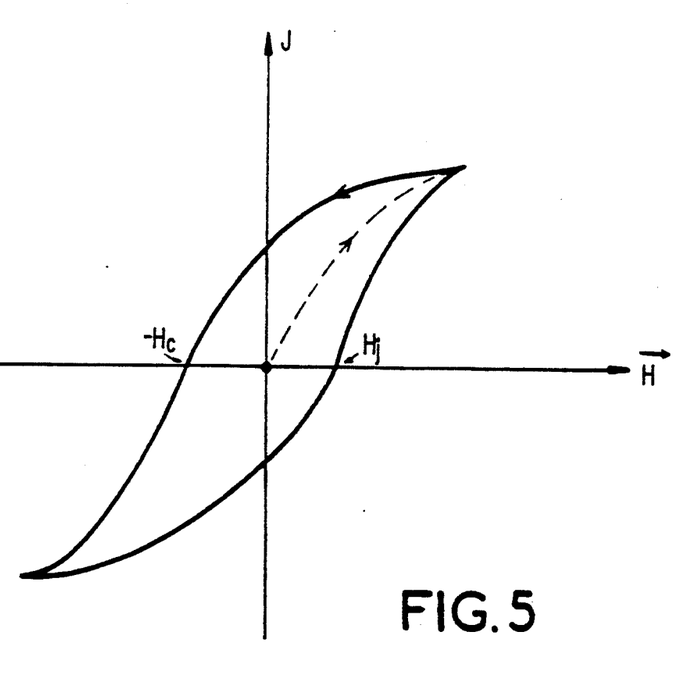
FIG. 5 shows the hysteresis cycle described by magnetization of a magnetic material that can be used in the invention as a function of the field applied.

The material (Ma) may also be a magneto-optical material. Under the effect of a laser beam, the magneto-optical material gets heated up, the local rise in temperature leads to variations of the magnetic parameter and the information bit is defined by the zone in which the previously oriented magnetization takes an antiparallel direction. More specifically, the layer of material (Ma) may be brought to saturation beforehand by the application of an external magnetic field greater than the coercive field at the ambient temperature (the coercive field Hc corresponds to the field capable of cancelling the induced magnetization and is illustrated by the hysteresis cycle of FIG. 5 giving the development of the magnetization J with the magnetic field H). Then an external field is applied in the plane of the layer, this external field being weaker than the coercive field and having a direction opposite that of the saturation field. When the heating prompted by the laser brings the material (Ma) beyond the Curie temperature Tc (the temperature at which the behavior of the material becomes paramagnetic), the magnetization flips over to an antiparallel direction, thus defining a bit. The transformation of the magneto-optical material therefore occurs only when the power density that it receives is greater than a certain threshold power density corresponding to a heating of the material such that the latter is taken to a temperature greater than the Curie temperature Tc.

The layers of magneto-optical materials may be made of cobalt combined with chromium or nickel or, again, of phosphorus. The manganese-bismuth material also has promising magnetic qualities owing to the hexagonal system in which it crystallizes. Table I illustrates exemplary embodiments of carriers made of magneto-optical material, the deposition method of which depends on the nature of the material.

TABLE I

| MATERIAL | THICKNESS | SUBSTRATE | MANUFACTURE |
| --- | --- | --- | --- |
| Chromium-cobalt | 80 | Glass+gold | Vacuum deposition |
| Chromium-phosphorus | 60 | Glass+gold | Electrolysis |
| Manganese-Bismuth | 70 | Glass | Vacuum deposition |

Irrespectively of the material (Ma) deposited on its substrate, the recording of information can be done by a laser with a short wavelength (for example a blue argon laser emitting at 457.9 nm) or a coherent source obtained by frequency doubling of a semiconductor laser or a neodymium type YAG laser focused on the surface of the layer of material (Ma). By appropriately adjusting the maximum power density of the optical beam focused, it is possible to record information elements smaller than 0.2 µm.

The recording method according to the invention can be carried out on carriers in the form of disks, cards (credit card type) or else tapes.

Figure 6:
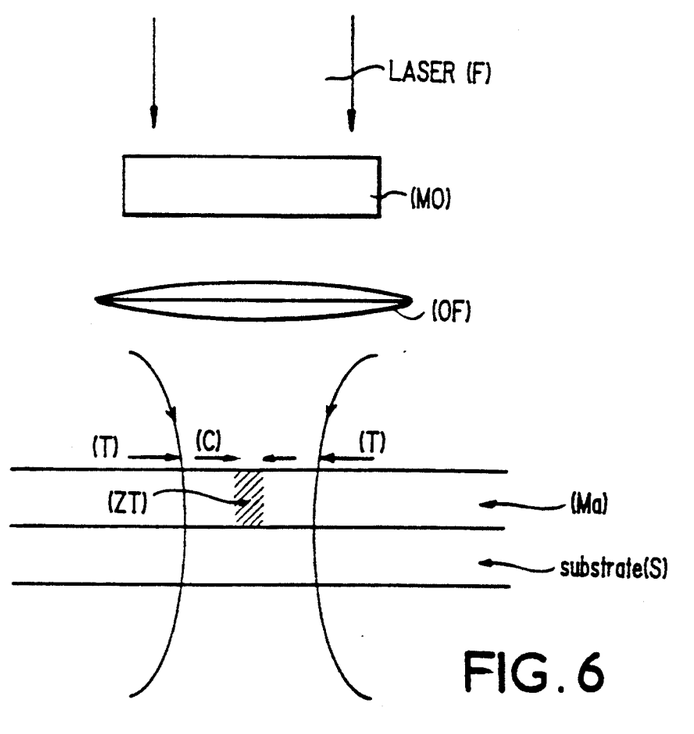
FIG. 6 illustrates an example of a device enabling the recording of information elements on a plane disk.

FIG. 6 illustrates an example of a device enabling the recording of information elements on a plane carrier disk capable of being made to rotate about an axis.

For the recording done by a laser beam (F) focused by means of a focusing objective (OF) on the layer of material (Ma) deposited on a substrate (S), the focused laser beam generates a focusing spot (T), only one central part (C) of which creates a transformation of the material corresponding to the information recorded. The transformed zone (ZT) has lateral dimensions several times smaller than those of the spot (T). This entails the assumption that the power density at the center of the spot should be slightly greater than the threshold power density of reaction of the material, for example it should be greater by a maximum of 20%. The focusing optical system can be shifted radially in relation to the disk (in a standard way) so that the entire useful surface of the disk can be scanned by the recording laser beam. The modulation of the recording beam according to the signal to be recorded on the carrier can be obtained in many ways. In a first embodiment, a light modulator (Pockels cells or other) is interposed on the path of the laser beam. This modulator (MO) is controlled so as to let through or interrupt the beam according to the information to be recorded. In a second embodiment, the laser itself may be modulated (it may be a semiconductor laser in particular with modulation of the injection current). Indeed, the information elements may be of a binary type, each recording by the useful part of the focused laser beam representing an information bit, or else the information elements may be of an analog type and, in this case, the useful information is represented by the length of a zone modified by the laser beam or again the distance between two successive local modifications of the layer of material (Ma).

A synchronization is provided between the modulation control and the relative shift of the disk and of the focusing spot so that the information elements are recorded with a well-determined spatial distribution. By recording information elements, one of the lateral dimensions of which is smaller than a recording half wavelength, it becomes also possible to obtain a spacing between recorded dots smaller than a half wavelength.

By making the most efficient possible adjustment of the maximum power density of the focused laser beam and the threshold power density of the material (Ma), it becomes possible to record information elements having sizes of the order of 0.1 µm separated by an equivalent distance of the order of 0.1 to 0.15 µm. A configuration such as this makes it possible to obtain a surface density of $2.10^9$ to $2.5.10^9$ bits/cm$^2$.

A surface density of information elements of this kind makes it possible to envisage optical recording in the field of high definition television.

Indeed, assuming that it is necessary to have a bit rate of 250 Mb/s, a one-hour television program corresponds to about $10^{12}$ bits, namely an area of 400 to 500 cm$^2$. A disk with a diameter of 30 cm, the useful surface area of which is between $R_1=15$ cm and $R_2=3$ cm, provides a useful surface area of 675 cm$^2$. It becomes possible to store an HDTV program of 80 minutes to 100 minutes per side. However, to make it easy to obtain freezing, slow motion and fast motion, it may be desirable to make an image correspond to a whole number of turns. Given the linear density, there should be ten tracks on the internal radius. If this arrangement (10 tracks/image) is preserved on the entire 30 cm disk, the duration of the program becomes equal to 40 minutes per side.

The use of an information carrier with such surface densities of information may also be promising in the field of digital sound. Indeed, assuming that it is necessary to have $10^2$ kbits/s available to store digital sound, the useful surface area to store one hour of digital sound becomes equal to 0.2 cm$^2$. A mini-compact disk type configuration, with a diameter of several- centimeters, may enable the storage of programs of several hours.

At present, the reading of very small-sized information elements very close to each other imperatively calls for the use of sources with small wavelengths (for example a blue source) in order to avoid, to the maximum, the simultaneous reading of several information elements due to the width of the focusing spot of the reading beam. This is why the present invention makes the maximum use also of the non-linearity of certain materials for the reading of information elements so that only the central part of the focusing spot of the reading beam can read information elements with sizes smaller than that of the focusing spot. It becomes possible with the reading method according to the invention, with a reading beam emitted at L, to read information elements having sizes appreciably smaller than L. In the case of information elements recorded according to the writing method of the invention, the wavelength of the reading beam may even be greater than the wavelength of the reading beam.

Thus, for the reading of an information carrier according to the invention, or of any other information carrier stored with very high surface densities, the invention proposes the coupling of the layer of material containing the information to a layer of material capable of being the site of stimulated emission. Indeed, stimulated emission phenomena intrinsically display non-linear behavior Hence, a material (Ma) is chosen wherein the previously recorded information elements are transparent to the wavelength $L_1$ of the reading beam which, in irradiating the material (Mb), generates a stimulated emission at the wavelength $L_2$ only very locally at the place where the power density of the beam at $L_1$ is greater than the threshold power density beyond which there is stimulated emission. The material (Mb) may be varied in nature. It may be a polymer doped with rhodamine for example. Indeed, the threshold power density of such a material is in the range of 100 kW/cm$^2$. A laser emitting at the wavelength $L_1$, at a few mW, may get focused on a light spot with a size of 0.5 μm and is capable of prompting a stimulated emission making it possible to reveal the information elements stored in the material (Ma).

The material (Mb) may also be a gallium arsenide type of semiconductor emitting in the near infrared range.

The material (Mb) may also be constituted by a glass or a crystal doped with a rare earth (neodymium in particular) and capable of emitting a radiation in the near infrared range.

The choice of the reading laser is dictated by the nature of the material (Mb) chosen. Its wavelength should be located in the absorption bands of the material Mb so as to induce the emission by the material Mb, at a different wavelength, generally greater than that of the reading laser. The reading method is thus far different from the reading methods of the optical carrier known to those skilled in the art, inasmuch as the reading is obtained not by diffraction of the reading beam by the information elements, but by light emission of the carrier itself at a wavelength different from that of the reading beam.

The reading may also be carried out by a frequency doubler material emitting at $L\frac{1}{2}$. At present, there are polymer type organic materials having good non-linear optical properties under frequency doubling. These materials are especially advantageous in terms of implementation and cost.

Figure 7:
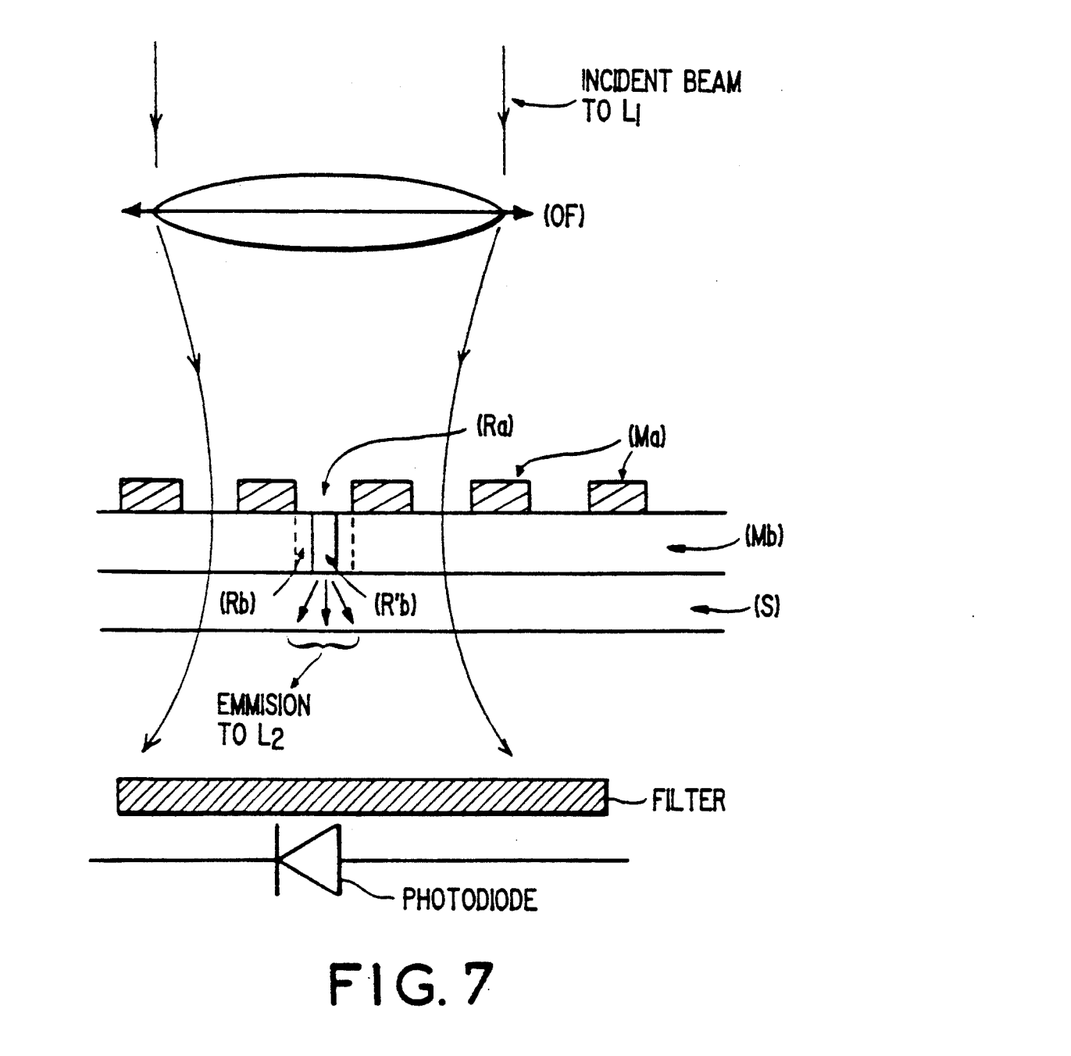
FIG. 7 illustrates an exemplary reading device according to the invention.

FIG. 7 shows an example of a device using an information carrier according to the invention. This carrier is constituted by a layer of metal and the stored information elements are holes in this layer. This layer is superimposed on a film of polymer (Mb) of the polymethylmethacrylate type doped with rhodamine, this film of material (Mb) being itself deposited on a transparent substrate. The reading method is carried out in transmission, a focusing beam is focused by means of an objective (OF) on the polymer film, the metal elements that are not etched at recording acting as masks- for the incident reading beam emitting at the wavelength $L_1$. Only the regions Rb of the material (Mb) that are facing the regions Ra between two metal pads in the present case receive the totality of the incident beam emitting at $L_1$. Furthermore, the power density received in a region Rb is such that only the regions R'b of the regions Rb receive a power density sufficient to generate a stimulated emission at the wavelength $L_2$. The regions of the material (Ma) that are different from the regions Ra, although they receive incident reading beam, transmit only a focused power density that is smaller than the threshold power density of the material (Mb), and cannot thus generate a stimulated emission at the level of this material. This reading method can be used to discriminate between one information element and a neighboring information element, even if these information elements are very small-sized (smaller than 0.2 μm) and separated by a very small distance (smaller than 0.2 μm).

A filter letting through only the emission wavelength $L_2$ can be positioned at output of the substrate. The filtered signal can be collected by a photodiode so as to restore the stored signal.

What is claimed is:

1. A method for optical writing of information elements comprising the steps of:
    generating a laser beam with a wavelength L;
    focusing the laser beam on a surface of a non-linear optical material to form the information elements on the non-linear optical material;
    wherein the steps of generating the laser beam and focusing the laser beam on the surface of the non-linear optical material determines that a maximum power density of the focused laser beam is slightly greater than a threshold power density of the material beyond which the material is optically transformed, so as to record the information elements smaller than a focusing spot of the laser beam.

2. The method for optical writing of information elements according to claim 1, wherein the non-linear optical material is a photosensitive resin.

3. The method for optical writing of information elements according to claim 1, wherein the non-linear optical material is a magneto-optical material.

4. The method for optical writing of information elements according to claim 1, wherein the non-linear optical material is a metallic material.

5. The method for optical writing of information elements according to claim 1, wherein the non-linear optical material is a material in which the variations in optical index being photoinduced.

6. The method for optical writing of information elements according to claim 1, wherein the information elements have at least one lateral dimension smaller than L/2.

7. The method for optical writing of information elements according to claim 6, wherein the recorded information elements are holes.

8. The method for optical writing of information elements comprising the steps of:
    generating a laser beam with a wavelength L;
    focusing the laser beam on a surface of a non-linear optical material to form the information elements on the material;
    wherein a maximum power density of the focused laser beam is slightly greater than a threshold power density of the material beyond which the material is optically transformed, so as to record the information smaller than a focusing spot of the laser beam; and
    wherein the non-linear optical material is deposited on a layer of material generating a stimulated emission.

9. The method for optical writing of information elements according to claim 8, wherein the non-linear optical material is metallic and wherein the material generating the stimulated emission is a polymethylmethacrylate type polymer doped with rhodamine.

10. The method for optical writing of information elements according to claim 8, wherein the non-linear optical material is metallic and wherein the material generating the stimulated emission is a gallium arsenide type semiconductor.

11. The method for optical writing of information elements according to claim 8, wherein the non-linear optical material is metallic and wherein the material generating the stimulated emission is a glass or a crystal doped with a rare earth.

12. A method for optical reading of information elements on an information carrier, the information carrier comprising two superimposed layers of a first material and a second material, said second material generating stimulated emission when illuminated beyond a threshold power density, comprising the steps of:

generating a laser beam with a wavelength L;

focusing the laser beam on the information carrier;

wherein only first regions of the first material in which the information elements have been recorded are transparent to the laser beam;

wherein the focusing of the laser beam at the wavelength is done on a surface of second regions of the second material that are facing the first regions; and wherein the laser beam has a power such that a power density at a center of the laser beam exceeds the threshold power density of the second material solely in a small zone with a surface area that is several times smaller that the surface area of the focusing spot of the laser beam, a presence or absence of the stimulated emission of the second material allowing for detecting the information elements.

13. The method for optical writing of information elements on an information carrier according to claim 12, wherein the first material is metallic and the first regions are holes.

* * * * *

UNITED STATES PATENT AND TRADEMARK OFFICE
CERTIFICATE OF CORRECTION

PATENT NO. : 5,323,372           Page 1 of 4
DATED      : June 21, 1994
INVENTOR(S) : Claude Puech, et al It is certified that error appears in the above-indentified patent and that said Letters Patent is hereby corrected as shown below:

On the drawing, Figures 1a, 1b, 2, 3, and 4, add the label --PRIOR ART--.

In the drawing, on the title page and in Figure 7 "EMMISION" should read --EMISSION--.

Signed and Sealed this

Sixth Day of December, 1994

Attest:

BRUCE LEHMAN

Attesting Officer    Commissioner of Patents and Trademarks